United States Patent [19]
Wakatsuki et al.

[11] Patent Number: 5,136,438
[45] Date of Patent: Aug. 4, 1992

[54] MAGNETIC DISK DEVICE HAVING AN AUTO-LOADING MECHANISM AND A DUST COLLECTING MECHANISM

[75] Inventors: Koosaku Wakatsuki, Ibaraki; Shoji Suzuki, Hamamatsu; Noriaki Okamoto, Ibaraki; Yuzo Yamaguchi, Tsuchiura; Katsuaki Kikuchi, Tsuchiura; Mikio Tokuyama, Tsuchiura; Yoshinori Takeuchi, Ishioka; Yoshihiko Miyake, Odawara, all of Japan

[73] Assignee: Hitachi, Ltd., Tokyo, Japan

[21] Appl. No.: 550,686

[22] Filed: Jul. 10, 1990

[30] Foreign Application Priority Data

Jul. 10, 1989 [JP] Japan .................. 1-175491

[51] Int. Cl.$^5$ .................. G11B 5/60; G11B 5/54; G11B 21/21; G11B 21/22
[52] U.S. Cl. .................. 360/69; 360/71; 360/75; 360/103; 360/105
[58] Field of Search .................. 360/103, 105, 75, 69, 360/71

[56] References Cited

U.S. PATENT DOCUMENTS

| | | | |
|---|---|---|---|
| 2,886,651 | 5/1959 | Vogel | 360/103 |
| 3,018,152 | 1/1962 | Cowan | 360/105 |
| 4,286,297 | 8/1981 | Root et al. | 360/103 |
| 4,473,855 | 9/1984 | Plotto et al. | 360/75 |
| 4,814,906 | 3/1989 | Suzuki et al. | 360/75 |

FOREIGN PATENT DOCUMENTS 59-104769 6/1984 Japan .

*Primary Examiner*—Robert S. Tupper
*Attorney, Agent, or Firm*—Antonelli, Terry, Stout & Kraus

[57] ABSTRACT

A magnetic head device has a magnetic head slider by means of which information is recorded in and read from a magnetic recording medium. The magnetic head slider is supported by a supporting structure having an internal cavity, an opening formed in a portion of the structure where the magnetic head slider faces the magnetic recording medium and communicating with the internal cavity, and a gas passage through which the gas introduced into the internal cavity through the opening is discharged to the exterior of the internal cavity. With this arrangement, the pressure acting on the back surface of the magnetic head slider is adjusted to keep the slider afloat, while removing dust suspended in the gas around the recording medium and the supporting structure.

14 Claims, 8 Drawing Sheets

MAGNETIC DISK DEVICE HAVING AN AUTO-LOADING MECHANISM AND A DUST COLLECTING MECHANISM

BACKGROUND OF THE INVENTION

1. Field of the Invention

The present invention relates to a magnetic head slider supporting device, a magnetic head slider, a magnetic disk device and a method of manufacturing the magnetic disk device. More particularly, the present invention relates to a magnetic head slider supporting device, as well as a magnetic head slider and a magnetic disk device, having a guide arm provided with an auto-loading mechanism capable of preventing adhesion between the magnetic head slider and a magnetic disk and a dust removing mechanism.

2. Description of the Related Art

In order to attain a higher recording density while improving reliability of a magnetic disk device, it is necessary to prevent adhesion between a magnetic head slider and a magnetic disk during suspension of operation of the magnetic disk device. It is also important to remove fine particles such as dust particles from the interior of the magnetic disk device, and to prevent accidental contact between the magnetic head slider and the magnetic disk referred to as "head crush".

Air loading mechanisms intended for preventing adhesion have been proposed. For instance, U.S. Pat. No. 4,286,297 discloses a loading mechanism in which stream of air generated between magnetic disks during rotation of these disks is applied to the back side of a magnetic head slider or a supporting spring structure so as to load the magnetic head slider. Another known method disclosed in Japanese Patent Unexamined Publication No. 59-104769 makes use of a sack-like elastic member or a visco-elastic film provided on the rear side of a magnetic head slider, such that the loading is conducted by supplying air to the sack-like elastic member or the visco-elastic film.

On the other hand, U.S. Pat. No. 4,814,906 discloses an arrangement for removing dust, wherein air suspended dust particles, induced through the air passage hole passing from a flat rail portion of the magnetic head slider to the rear side of the same, are sucked by a suction means so that the particles are trapped and removed.

Thus, each of the known methods and arrangements mentioned above can overcome only one of the aforementioned critical or important requirements for improving the reliability of a magnetic disk device. In other words, none of these known arts could simultaneously meet all the critical requirements for improving the reliability of magnetic disk devices. Thus, there still exists a demand for improvement in the reliability of the magnetic disk device.

SUMMARY OF THE INVENTION

Accordingly, an object of the present invention is to provide a magnetic head slider supporting device which can simultaneously prevent all the troubles encountered with the known devices of the type described, namely, adhesion between the magnetic head slider and the magnetic disk, generation of dust resulting from interference or contact between a magnetic head slider and a magnetic disk and removal of the dust.

Another object of the present invention is to provide a magnetic head slider suitable for use in combination with the above-mentioned magnetic head slider supporting device.

Still another object of the present invention is to provide a magnetic disk device using a guide arm, as well as a method of producing the same, capable of removing fine particles such as dust particles in the magnetic disk device.

A further object of the present invention is to provide an auto-loading mechanism capable of preventing adhesion between a magnetic head slider and a magnetic disk.

To eliminate the problem concerning the adhesion of the magnetic head slider and the generation of dust, the present invention provides a magnetic head slider supporting structure in which an internal cavity with an opening is formed in a portion of the supporting structure where the magnetic head slider opposes the magnetic recording medium, and a gas passage through which a gas introduced into the internal cavity through the opening is discharged to the exterior of the internal cavity.

The invention also provides a magnetic head slider in which a plurality of head terminals are arranged at different positions on the magnetic head slider.

The loading of the magnetic head slider is accomplished by controlling a suction means which is provided in communication with the gas passage. A combination of the magnetic head slider supporting structure and the suction means provides a magnetic disk device which can simultaneously overcome the problems of the adhesion of the magnetic head slider and generation of dust.

According to the invention, automatic loading of the magnetic head slider is possible by controlling such that the weight load applied to the magnetic head slider is exceeded by a force $F_0$ which is the product of the area A of the portion of the magnetic head slider opposing the magnetic recording medium and the pressure differential $(P_0 - P)$ between the pressure $P_0$ acting on the surface of the magnetic head slider facing the magnetic recording medium and the pressure P acting on the back side of the magnetic head slider. When the magnetic head slider is maintained afloat, by adjusting the pressure on the backside of the magnetic head slider so as to induce a gas through the gap between the edges of the opening and the magnetic head slider, it is possible to trap and remove particles such as dust particles suspended in the gas.

DESCRIPTION OF THE PREFERRED EMBODIMENTS

Preferred embodiments of the present invention will be described with reference to the accompanying drawings.

Figure 1:
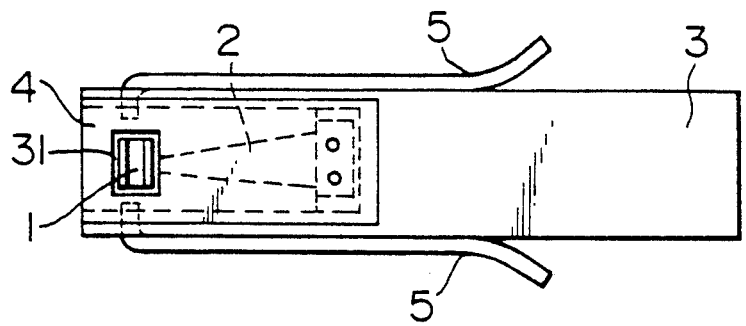
FIG. 1 is a plan view of a guide arm incorporated in an embodiment of the magnetic head slider supporting device of the present invention.
Figure 2:
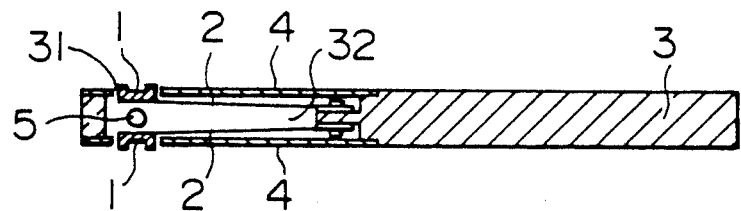
FIG. 2 is a sectional view of the guide arm shown in FIG. 1.

FIGS. 1 and 2 are a plan view and a sectional view of a guide arm as supporting means in an embodiment of the magnetic head slider supporting device of the present invention. Magnetic head sliders 1 are secured to a resilient supporting spring structure 2 which is fixed to a guide arm 3. Cover plates 4 are fixed to the guide arm 3 so as to cover the magnetic head sliders 1 and to define an internal cavity 32 with the guide arm 3. Each cover plate 4 is provided at its portion confronting the magnetic recording medium with openings 31 which are sized so as not to restrict the movement of the magnetic head slider 1. The magnetic head slider 1 is allowed to slightly project from this opening towards the magnetic recording medium so that it can record and read information in and from the magnetic recording medium. Pipes 5 serving as gas passages are secured to the side surfaces of the guide arm 3. A gas introduced into the internal cavity 32 of the guide arm through the gap in the openings 31 of the cover plates 4 is then sucked through these pipes 5 and led through, for example, flexible tubes to a pressure gradient portion in the magnetic disk device or an external means for generating a pressure gradient.

Figure 3:
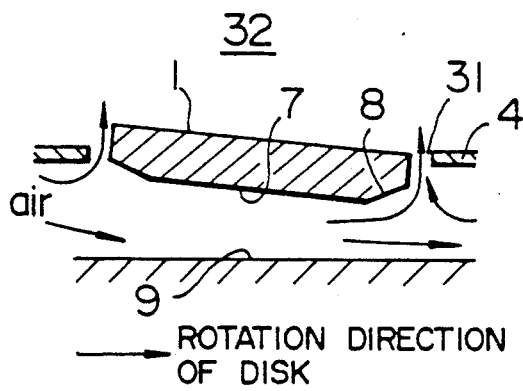
FIG. 3 is an illustration of operation of a magnetic head slider supporting device performed when a negative-pressure type slider is used.

When the magnetic head slider is of the type which incorporates a vacuum generating mechanism, the operation of the guide arm 3 is as follows. A gas suspending dust particles and so on is introduced into the internal cavity 32 of the guide arm 3 through the gaps between the edges of the openings 31 in the cover plates 4 and the magnetic head sliders 1, by the operation of the means for generating pressure gradient, as shown in FIG. 3. During operation of the magnetic head device, a portion of the gas is compressed in the gas bearing generating portion, i.e., in the flat rail 7, and is allowed to expand in the negative pressure generating portion 8. A portion of the thus expanded gas also is introduced into the internal cavity 32 of the guide arm 3. A similar effect is produced when the slider is a monolithic head slider or when the slider is a vanish slider which is used for the purpose of smoothing the coated surface of the magnetic disk 9 as a magnetic recording medium by removing any projection in the surface.

Figure 4:
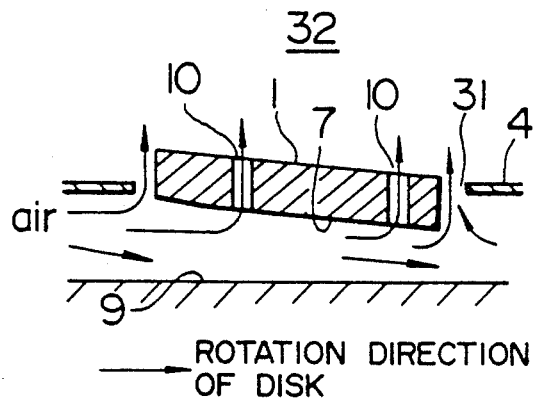
FIG. 4 is an illustration of operation of a magnetic head slider supporting device performed when a magnetic head slider with gas passage holes in the floating surface is used.

FIG. 4 illustrates an arrangement which incorporates a magnetic head slider of the type having gas passage ports 10 extending from the flat rail portion 7 to the rear side of the floating surface. This type of magnetic head slider 1 produces a remarkable effect in that, when dust particles or the like depositing to the surface of the rotating magnetic disk 9 are introduced to the region under the flat rail 7, these particles are discharged to the backside of the floating surface due to the difference in the pressure between the gas compressed at the floating surface where the gas bearing action takes place and the atmospheric pressure existing in the gas passage ports 10.

Figure 5:
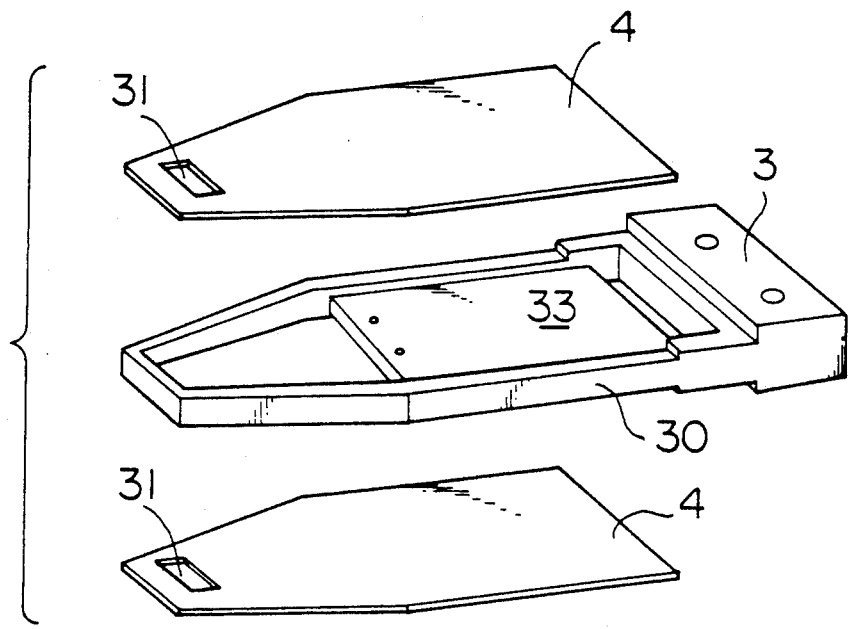
FIGS. 5, 6 and 7 are exploded perspective views of different embodiments of the magnetic head slider supporting device of the present invention.

FIG. 5 shows another embodiment of the magnetic head slider supporting device of the present invention. In this embodiment, a frame portion 30 formed on an end of the guide arm 3 is formed with recesses at upper and lower surfaces and cover plates 4 having openings 31 are attached to the upper and lower sides of the frame portion 30, thus forming a gas passage 33 inside the guide arm 3. Thus, the guide arm 3 itself performs the function of the pipes 5 in the preceding embodiment described in connection with FIG. 1.

Figure 6:
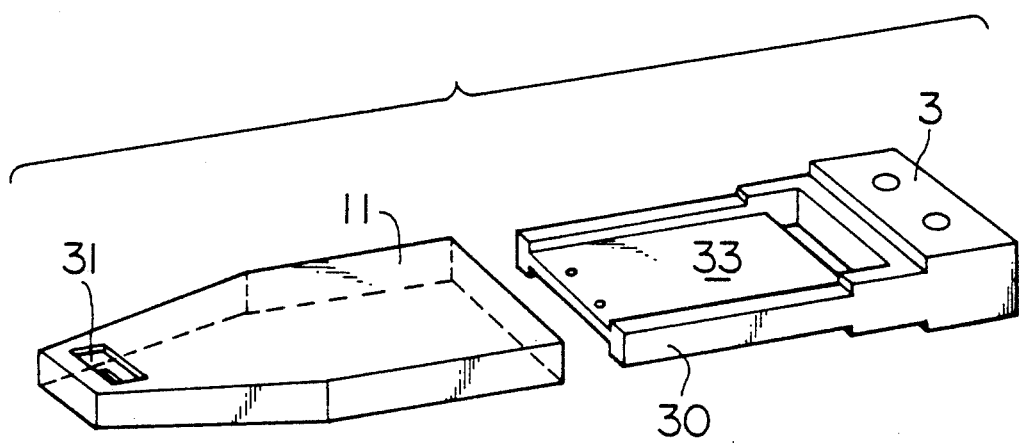

FIG. 6 shows a different embodiment in which the cover plates 4, 4 used in the embodiments shown in FIGS. 1 and 2 are substituted by a sack-like cover member 11 having openings 31 and fitted on the frame portion 30 on the end of the guide arm 3 so as to form a gas passage 33.

Figure 7:
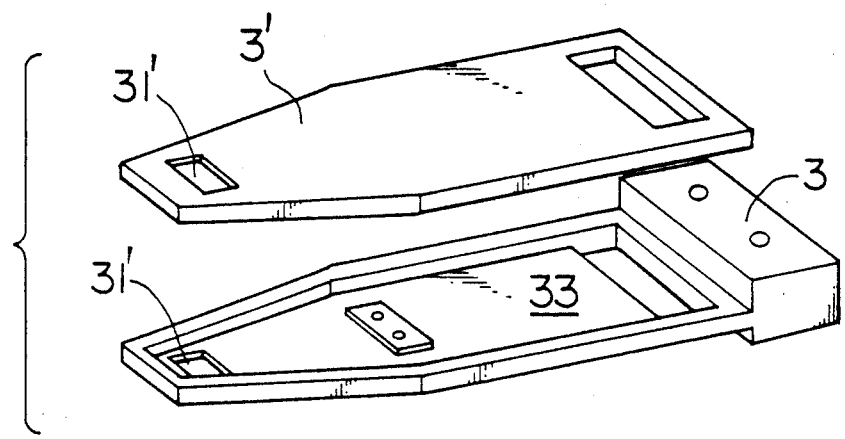

FIG. 7 shows a different embodiment, in which the guide arm is composed of two half portions 3, 3' which are formed separately and then assembled together to form a gas passage 33 therein.

Figure 8:
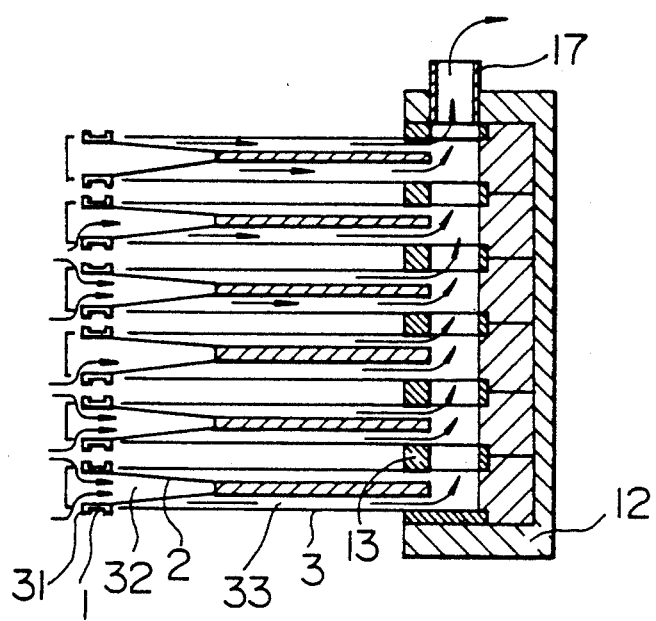
FIG. 8 is an illustration of a gas passage formed when a plurality of guide arms are assembled integrally.
Figure 9:
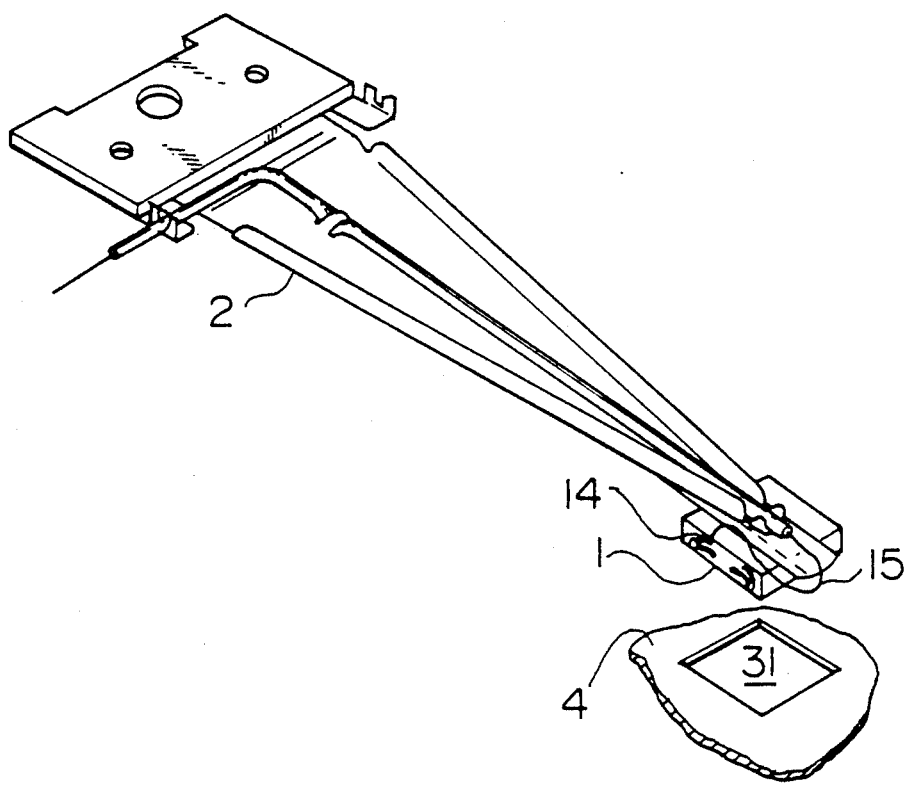
FIG. 9 is an illustration of a magnetic head slider with a lead wire adhered to the back side thereof so as to extend in the longitudinal direction.

In general, a current magnetic disk device has a plurality of disks stacked in layers, in order to attain a higher storage density. FIG. 8 shows an assembly suitable for use in combination with such a stack of magnetic disks. This assembly has a plurality of guide arms 3 stacked in a manner to correspond to the stack of the magnetic disks, each guide arm having an internal gas passage 33 of the type shown in FIG. 5, 6 or 7. These guide arms 3 are secured to a common arm holder 12. Packings 13 with gas passage are placed between the respective adjacent guide arms 3. The arrangement is such that the gas sucked through the gaps between the edges of the openings 31 and the magnetic head sliders 1 of all the magnetic head slider supporting devices can be induced through a single pipe 17.

When the guide arm of the present invention is used in combination with a conventional magnetic head slider, a problem is encountered in that a lead wire leading from the thin-film head terminal extends vertically from the terminal, causing a risk for interference with the edges of the opening so as to restrict the movement of the magnetic head slider.

FIGS. 9, 10, 11 and 12 show arrangements which can overcome the above-described problem. More specifically, in FIG. 9, the lead wire 15 leading from a thin-film head terminal 14, which is provided on an air-outlet side surface of the slider, is extended to the rear side of the magnetic head slider 1 so that the opening 31 for air loading is formed in a rectangular form substantially conforming with the rectangle of the magnetic head slider 1.

Figure 10:
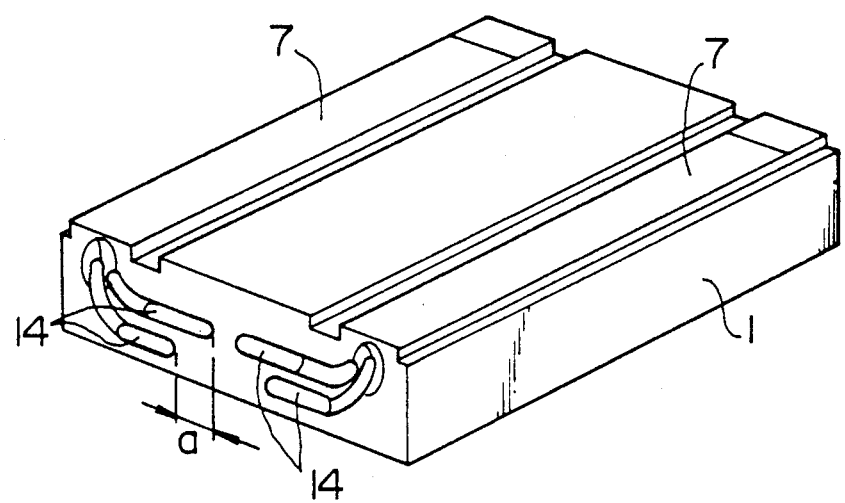
FIGS. 10, 11 and 12 are illustration of positions for mounting a thin film head terminal.

In an arrangement shown in FIG. 10, there are two pairs of thin-film head terminals, namely, a pair of terminals 14 which are adjacent to the floating surface where the flat rails 7 are formed and another pair of terminals adjacent the back side of the head slider 1. The terminals 14 adjacent the back side of the head slider 1 are offset by a distance a outwardly from the positions where the terminals 14 adjacent the floating surface terminate. With this arrangement, it is possible to extend the lead wires 15 straight to the back side of the slider also from the terminals 14 adjacent the floating surface of the slider.

Figure 11:
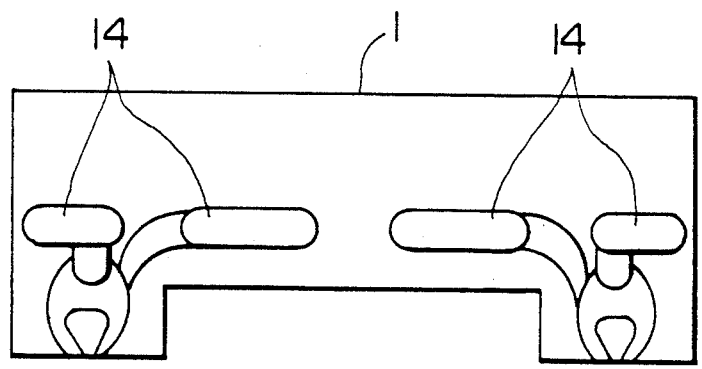

In an arrangement shown in FIG. 11, thin-film head terminals 14 elongated in the breadthwise direction of the magnetic head slider are arrayed substantially in a row which extends in the breadthwise direction of the magnetic head slider 1. This arrangement also enables the lead wires to extend straight to the back side of the slider. Furthermore, this arrangement contributes to a reduction in the thickness of the magnetic head slider 1 and makes it possible to reduce the weight of the magnetic head slider 1 and to produce a greater number of magnetic head sliders from a given wafer.

Figure 12:
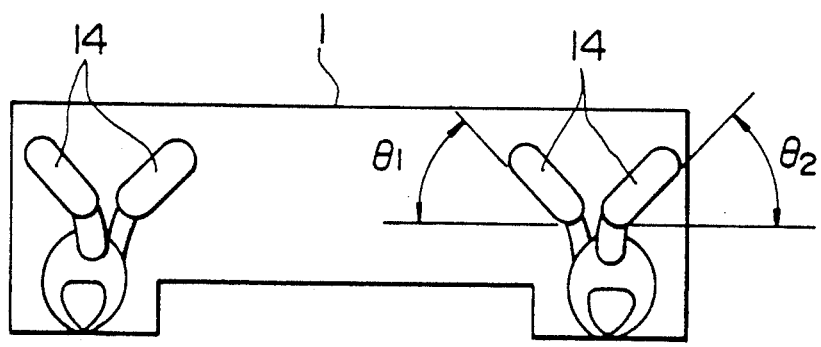

In an arrangement shown in FIG. 12, the thin-film head terminals 14 of the respective pairs are inclined at angles 81 and 82 with respect to the floating surface. This arrangement also enables the lead wires to be led straight to the back side of the slider. The same advantages can be obtained without requiring the thickness of the magnetic head slider 1 to be increased, when the angles $\theta_1$ and $\theta_2$ are determined to be 45°.

Figure 13:
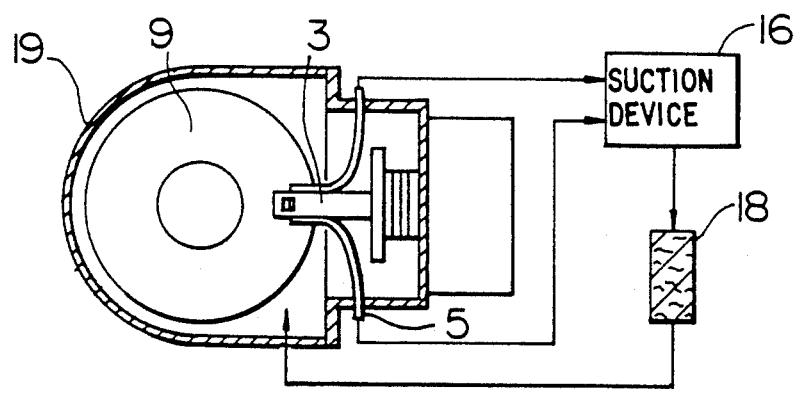
FIG. 13 is an illustration of an embodiment of the magnetic disk device of the invention incorporating a magnetic head slider supporting device constructed in accordance with the present invention.
Figure 14:
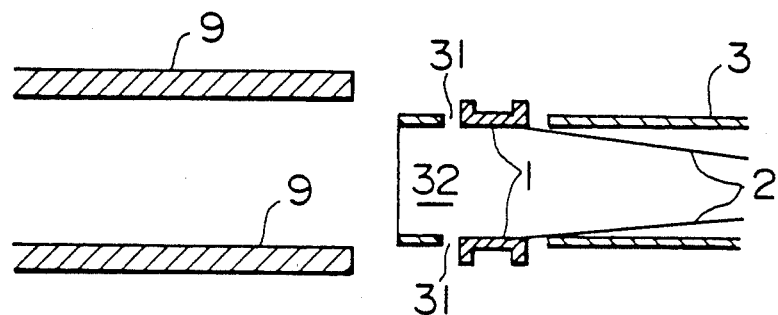
FIGS. 14, 15, 16 and 17 are illustrations of operation of the auto-loading mechanism incorporated in the magnetic disk device shown in FIG. 13.
Figure 15:
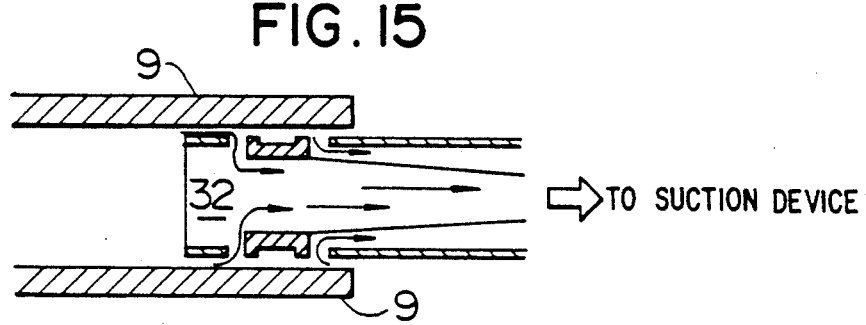
Figure 16:
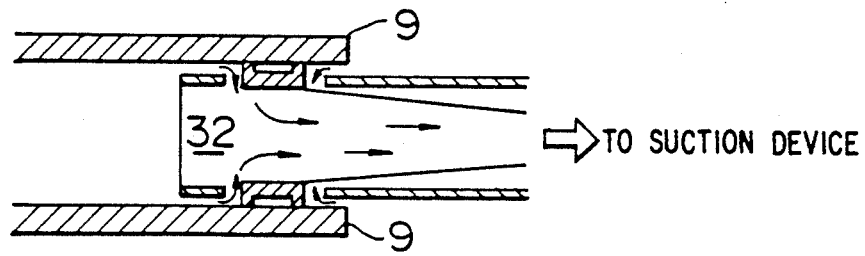

FIG. 13 illustrates an embodiment of the magnetic disk device incorporating a magnetic head slider supporting device of the present invention. The magnetic disk device includes magnetic disks 9, and a magnetic disk device body 19 in which guide arms 3 are received for supporting a magnetic head slider, the magnetic disks 9 and the magnetic head sliders being adapted to make movement relative to each other. The magnetic disk device also has a suction device 16 such as a vacuum pump and filtration device such as a filter 18. The suction device 16 is connected at its suction end to the aforementioned pipes 5 and at its discharge end to a disk-mounting space inside the magnetic disk device body 19. This arrangement enables an operation to be performed as shown in FIGS. 14, 15 and 16. As shown in FIG. 14, during unloading, the magnetic head sliders 1 are disposed apart from the outer end extremities of the magnetic disks 9. In this state, supporting spring structure 2 is deformed due to its resiliency but is supported at its one end by the edge of the opening 31 so that interference or contact between two adjacent head sliders is avoided. In the loaded state as shown in FIG. 15, the pressure in the internal cavity 32 of the guide arm 3 is regulated by the suction device 16 so that the magnetic head sliders 1 are lifted towards the back side thereof. When the rotation of the magnetic disks has become steady, the magnetic head sliders 1 are moved into the space between the disks 9 and the suction power of the suction device 16 is controlled to relieve the pressure inside the cavity 32 in the guide arm 3 to a predetermined level thereby causing the magnetic head sliders 1 to float above the surfaces of magnetic disks 9. It is possible to gently and smoothly float the magnetic head sliders 1 without bringing the sliders 1 into contact with the magnetic disks 9, by gently relieving the pressure to the above-mentioned predetermined level. The predetermined pressure level is determined such that the posture of the floating magnetic head sliders are not influenced. In this state, gas is sucked through the gaps between the edges of the opening 31 and the magnetic head slider 1. The gas introduced into the internal cavity 32 of the guide arm 3 is sucked by the suction device 16 through the pipes 5 and then through gas passages formed by, for example, flexible tubes. The sucked gas is then discharged and is made to pass through the filtering device 18 for trapping dust particles, whereby cleaned gas is returned to the interior of the magnetic disk device body 19. It is also possible to arrange such that, during the cleaning, the external suction device 16 and the external filtering device 18 are not used and, instead, the gas is sucked by the pressure gradient existing in the magnetic disk device and the dust particles are trapped and removed by an internal filtering device, as shown in FIG. 16.

It is also possible to operate the magnetic disk device in such a manner that the magnetic disks during start-up are rotated for a while at a speed lower than the normal operation speed so as to keep the magnetic head sliders 1 afloat at a predetermined height above the disk surfaces so as to perform predetermined seek cycles thereby removing dust from the disk surfaces, and then the disk rotation speed is raised to normal speed followed by ordinary accessing operation.

The magnetic head sliders 1 are held in contact with the magnetic disks 9 when the magnetic disk device is stopped. According to the invention, it is possible to supply a dried gas or a hot gas into the guide arms 3 so as to separate the magnetic head sliders from the magnetic disks 9 to which the magnetic head sliders 1 have sticked, before the magnetic disk device is started up. The heat for generating such a hot gas may be derived from coil of a voice coil motor for driving the seek mechanism. Stopping of the magnetic disk device may be effected in reverse procedure.

In the magnetic disk device described hereinabove, the amount or height of float of the magnetic head sliders can be controlled by changing the rotation speed of the magnetic disks 9 or the suction pressure developed by the suction device 16, as will be understood from the following description.

Figure 17:
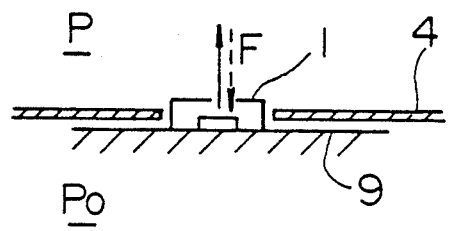

Referring to FIG. 17, load applied to the magnetic head slider 1 is represented by F, pressures acting on the surface of the magnetic head slider 1 adjacent to and opposite to the disk are respectively represented by P and $P_0$ and an area of the portion of the magnetic head slider 1 facing the disk is represented by A. In this case, the magnetic head slider 1 floats when the condition A $(P_0-P) > F$ is met during the rotation of the magnetic disk. The pressure $P_0$ is determined by the rotation speed of the magnetic disk 9, while the pressure P is determined by the suction pressure developed by the suction device.

According to the invention, it is not necessary to conduct so-called contact start and stop operation (CSS Operation) when the magnetic disk device is started up and stopped. It is therefore possible to materially eliminate troubles such as damaging of the magnetic disk due to presence of dust and adhesion, as well as damaging of the supporting spring structure, whereby the reliability of the magnetic disk device is remarkably improved. The invention also offers an additional advantage in that, since the supporting spring structure is received in the internal cavity 32 of the guide arm 3, any fluctuation in the floating height of the magnetic head slider 1 attributable to turbulence of air is suppressed to stabilize the level of the output.

Figure 18:
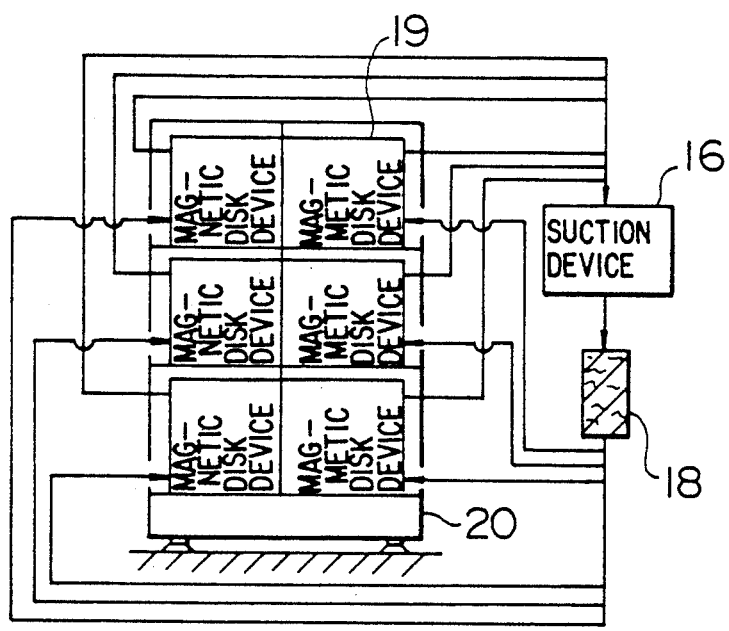
FIG. 18 is a schematic illustration of another embodiment of the magnetic disk device of the present invention.

FIG. 18 shows an embodiment in which a suction device 16 and the filtering device 18 are connected to magnetic disk devices 19 housed in the housing 20. By connecting a plurality of magnetic disk devices 19 to common suction device and filtering device, it is possible to reduce the mounting space of the housing 20.

Figure 19:
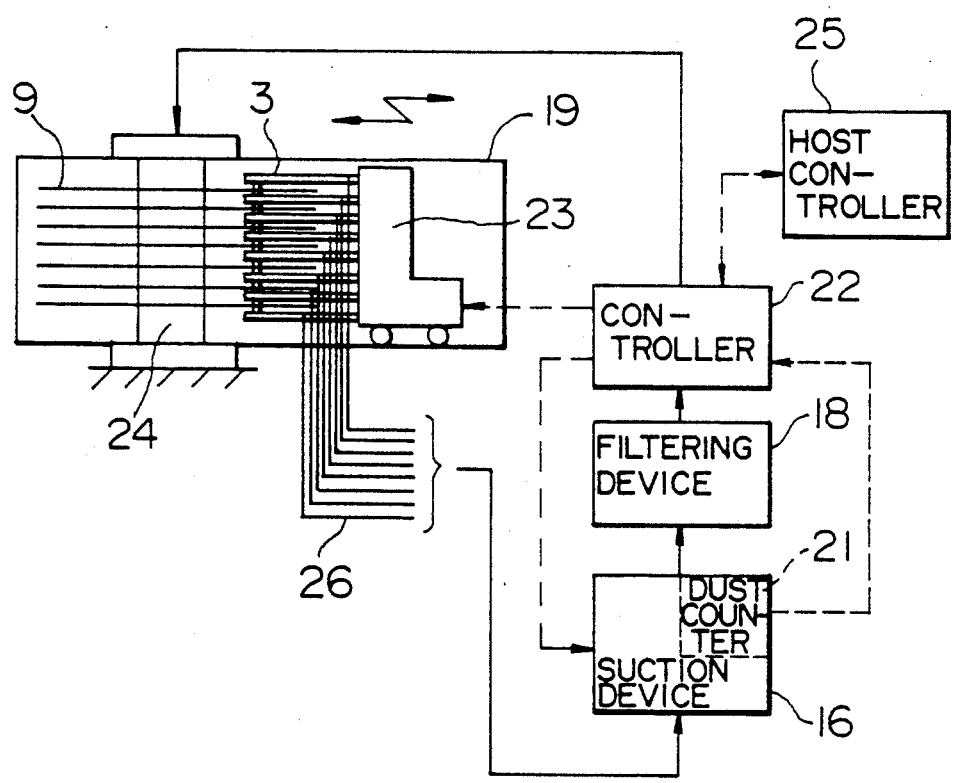
FIG. 19 is a schematic illustration of still another embodiment of the magnetic disk device of the present invention.

FIG. 19 is a plan view of a magnetic disk device having a controller 22. A suction device 16 is connected at its suction end to the internal cavities in the guide arms 3. The suction device 16 has a dust counter 21 incorporated therein so that the gas suspending dust particles is introduced into the dust counter 21 through flexible tubes 26. The dust counter measures the quantity of the dust and delivers a signal indicative of the dust quantity to the controller 22. The controller 22 compares the data concerning the dust quantity derived from the dust counter 21 with a predetermined data and produces, in accordance with the result of the comparison, a status data concerning the present status of the disk device and delivers this data to a host controller 25. When the host controller 25 has decided that the quantity of the dust exceeds an allowable upper limit level, the host controller 25 issues instructions through the controller 22 to the suction device 16 so as to reduce the pressure in the internal cavities of the guide arms to a level below that maintained during cleaning, whereby the magnetic head sliders are switched to unload state. At the same time, an instruction may be given to the seek mechanism 23 so as to move the magnetic head sliders 1 to a region outside the outer ends of the magnetic disks 9 to stop the rotation driving mechanism 24.

Obviously, the dust counter 21 may be arranged separately from the suction device 16, although in the described embodiment the dust counter is incorporated in the suction device 16. It is also to be noted that the Watlas-type supporting structure for supporting the magnetic head sliders in the described embodiments may be substituted by other suitable supporting structure or method. There is no restriction in the materials of the members such as the guide arm, cover plates and sack-like cover, nor in the number of the magnetic head sliders to be carried by a single guide arm.

As will be understood from the foregoing description, it is possible to obtain a magnetic disk device which simultaneously overcomes both critical problems which hampers the reliability of the magnetic disk device, namely, stick of the magnetic head slider to the disk surface and dust.

The invention also provides a magnetic head slider supporting device having a simple construction and capable of simultaneously eliminating sticking of the magnetic head slider and dust.

An auto-loading meachnism capable of preventing stick of the magnetic head slider also is provided by the present invention.

What is claimed is:

1. A magnetic disk device comprising a magnetic recording medium and magnetic head slider supporting means adapted for use with a magnetic head slider to be mounted therewith, wherein said magnetic head slider supporting means supports said magnetic head slider and allows movement thereof relative to said recording medium, and wherein said magnetic head slider supporting means includes an internal cavity with an opening formed at a portion thereof where said magnetic head slider is located and can move, said magnetic head slider faces said recording medium, and a gas passage through which gas introduced into said internal cavity through said opening is delivered to an exterior of said magnetic head slider supporting means.

2. A magnetic disk device having a plurality of magnetic recording mediums stacked one above another; and a plurality of magnetic head slider supporting means adapted for use with magnetic head sliders mounted therewith, respectively, wherein said plurality of magnetic head slider supporting means provide carrying support for said magnetic head sliders and allow movement of said magnetic head sliders relative to said magnetic recording mediums, wherein each one of said plurality of magnetic head slider supporting means includes a supporting spring structure, which resiliently supports a corresponding magnetic head slider, and a guide arm which supports one end of said supporting spring structure, wherein said guide arm includes an internal cavity which receives said magnetic head slider and said supporting spring structure and which is provided with an opening formed at a portion thereof where said magnetic head slider is located and can move, said magnetic head slider faces said recording medium, and wherein said guide arm further includes a gas passage through which gas introduced into said internal cavity through said opening is delivered to an exterior of said supporting structure.

3. A magnetic disk device including a frame accommodating a magnetic disk recording medium, a magnetic head slider and magnetic head slider supporting means for providing support of said magnetic head slider and allowing movement thereof relative to said recording medium, wherein said magnetic head slider supporting means includes an internal cavity having an opening where said magnetic head slider is located and can move, and through which gas is introduced from a disk-mounting space included in said magnetic disk device and a gas passage through which said gas is moved, and wherein said magnetic disk device further comprises suction means disposed between said gas passage and said disk-mounting space for sucking the gas from said internal cavity and delivering the sucked gas into said disk-mounting space.

4. A magnetic disk device according to claim 3, wherein said magnetic head slider supporting means further includes a supporting spring structure, for resiliently supporting said magnetic head slider, and a guide arm for supporting one end of said supporting spring structure, wherein said guide arm includes said internal cavity and said opening, said magnetic head slider faces said recording medium, and wherein said guide arm further includes said gas passage through which gas introduced into said internal cavity through said opening is moved.

5. A magnetic disk device comprising a plurality of magnetic head disk device units each including a frame accommodating a magnetic disk recording medium, a magnetic head slider and magnetic head slider supporting means for providing support of said magnetic head slider and allowing movement thereof relative to said recording medium, said plurality of magnetic head disk device units being housed in a common housing, wherein each one of said plurality of magnetic head slider supporting means includes an internal cavity having an opening where said magnetic head slider is located and can move, and through which gas is introduced from a disk-mounting space included in said magnetic disk device unit thereof and a gas passage through which said gas is moved, and wherein suction means is disposed between gas passages and disk-mounting spaces associated with said plurality of magnetic disk device units for sucking gas from each said internal cavity and delivering the sucked gas into said disk-mounting spaces.

6. A magnetic disk device according to claim 3, wherein said suction means includes a single suction device.

7. A magnetic disk device according to claim 5, wherein each one of said magnetic head slider supporting means further includes a supporting spring structure, for resiliently supporting said magnetic head slider, and a guide arm for supporting one end of said supporting spring structure, wherein said guide arm includes said internal cavity and said opening, said magnetic head slider faces said recording medium, and wherein said guide arm further includes said gas passage through which gas introduced into said internal cavity through said opening is moved.

8. A magnetic disk device including a frame accommodating a magnetic disk recording medium, a magnetic head slider, magnetic head slider supporting means for providing support of said magnetic head slider and allowing movement thereof relative to said recording medium, and drive means for driving said magnetic head slider supporting means, wherein said magnetic head slider supporting means includes an internal cavity having an opening where said magnetic head slider is located and can move, and through which gas is introduced form a disk-mounting space included in said magnetic disk device and a gas passage through which said gas is moved, and wherein said magnetic disk device further comprises suction means disposed between said gas passage and said disk-mounting space for moving said gas out of said internal cavity and detection means connected to a discharge side of said suction means for measuring the quantity of dust suspended in the discharged gas, and a controller for controlling operation of said magnetic disk device unit in accordance with a signal from said detection means indicative of the quantity of dust measured.

9. A magnetic disk device according to claim 8, wherein said magnetic head slider supporting means further includes a supporting spring structure, for resiliently supporting said magnetic head slider, and a guide arm for supporting one end of said supporting spring structure, wherein said guide arm includes said internal cavity and said opening, said magnetic head slider faces said recording medium, and wherein said guide arm further includes said gas passage through which gas introduced into said internal cavity through said opening is moved.

10. A magnetic head slider supporting device, adapted for use with a magnetic head slider, comprising a supporting spring structure for resiliently supporting at a free, first end thereof said magnetic head slider, which is arranged to face a recording medium, and a guide arm which supports an opposing, second end of said supporting spring structure, said guide arm including covering means for defining an internal cavity which receives said magnetic head slider and said supporting spring structure and which is provided with an opening formed at a portion thereof where said magnetic head slider is located and can move, in said guide arm further including a gas pressure through which gas introduced into said internal cavity through said opening is moved to an exterior of said internal cavity.

11. A magnetic head slider supporting device comprising a plurality of supporting spring structures for resiliently supporting at free, first ends thereof magnetic head sliders, which are respectively arranged to face recording mediums and which are stacked on one another, and a plurality of guide arms for supporting at first ends thereof, opposing, second ends of said supporting spring structures, respectively, while opposing, second ends of said guide arms are stacked and are integrally held by a holding member included in the device, wherein each of said plurality of guide arms includes covering means for defining an internal cavity which receives said magnetic head slider and said supporting spring structure and which is provided with an opening formed at a portion thereof where said magnetic head slider is located and can move, and wherein each of said plurality of guide arms further includes a gas passage, the gas passages provided in said plurality of guide arms are connected to a second gas passage formed in said holding member and leading to an external gas passage.

12. A head slider loading device in a magnetic disk device of the type which includes a magnetic recording medium, and magnetic head slider supporting means adapted for use with a magnetic head slider mounted therewith, said supporting means providing support for said magnetic head slider and allowing movement thereof relative to said recording medium, said magnetic head slider supporting means including an internal cavity with an opening formed at a portion of said magnetic head slider supporting means where said head slider is located and can move, said magnetic head slider faces said recording medium, and a gas passage through which a gas introduced into said internal cavity through said opening is moved, said head slider loading means comprising:
    means for locating said magnetic head slider at a region outside the end extremity of said recording medium when unloading said magnetic head slider;
    means for reducing, when loading said magnetic head slider, the pressure in said internal cavity of said magnetic head slider supporting means to a level below the pressure in said magnetic disk device;
    means for moving said magnetic head slider into a region of the surface of said recording medium when reduced pressure is established in said internal cavity; and
    means for establishing a predetermined pressure in said internal cavity after the rotation speed of said recording medium has reached a predetermined speed.

13. A head slider loading device in a magnetic disk device of the type comprised of at least one magnetic disk device unit in which each includes a magnetic disk recording medium and magnetic head slider supporting means adapted for use with a magnetic head slider mounted therewith, wherein said magnetic head slider supporting means provides support for said magnetic head slider and allows movement thereof relative to said recording medium; and driving means for driving said magnetic head slider supporting means of each of said at least one magnetic disk device unit, wherein said magnetic head slider supporting means includes an internal cavity with an opening formed at a portion of said magnetic head slider supporting means where said magnetic head slider is located and can move, said magnetic head slider faces said recording medium, and a gas passage through which gas introduced into said internal cavity through said opening is moved, wherein said magnetic disk device further includes suction means for moving the gas provided between said internal cavity and a magnetic disk-mounting space corresponding to each of said at least one magnetic disk device unit, and said head slider loading device further comprises control means for controlling said driving means and said suction means in such a manner that, when unloading said magnetic head slider, said magnetic head slider is moved to a region outside the end extremity of said recording medium whereas, when loading said magnetic head slider, the pressure in said internal cavity of said magnetic head slider supporting means is reduced to a level below the pressure in said magnetic disk device portion and, thereafter, said head slider is moved into a region of the surface of said recording medium, and, when the rotation speed of said disk has reached a predetermined normal rotation speed, a predetermined pressure is established in said internal cavity of said supporting means.

14. A magnetic disk device comprising a magnetic disk recording medium and a magnetic head slider supporting means adapted for use with a magnetic head slider mounted therewith, said magnetic head slider supporting means providing support for said magnetic head slider and allowing movement relative to said magnetic recording medium, wherein said supporting means includes a supporting spring structure for resiliently supporting said magnetic head slider and a guide arm for supporting said supporting spring structure, wherein said guide arm includes an internal cavity which receives said magnetic head slider and said supporting spring structure, an opening formed at a portion thereof where said head slider is located and can move, said head slider faces said recording medium, and a gas passage through which gas introduced into said internal cavity through said opening is delivered to the exterior of said internal cavity, said magnetic disk device comprising control means for operating, during start-up of said magnetic disk device, said magnetic recording medium at a rotation speed below the normal operation speed thereof and for driving said magnetic head slider into the region of the surface of said recording medium while sucking gas into said internal cavity through said opening thereby to collect and remove dust from disk-mounting space in said magnetic disk device.

* * * * *